March 18, 1924.

T. SLOPER 1,487,036

APPARATUS FOR USE IN THE MANUFACTURE OF RUBBER GOODS

Filed Jan. 11, 1923   2 Sheets-Sheet 1

INVENTOR.

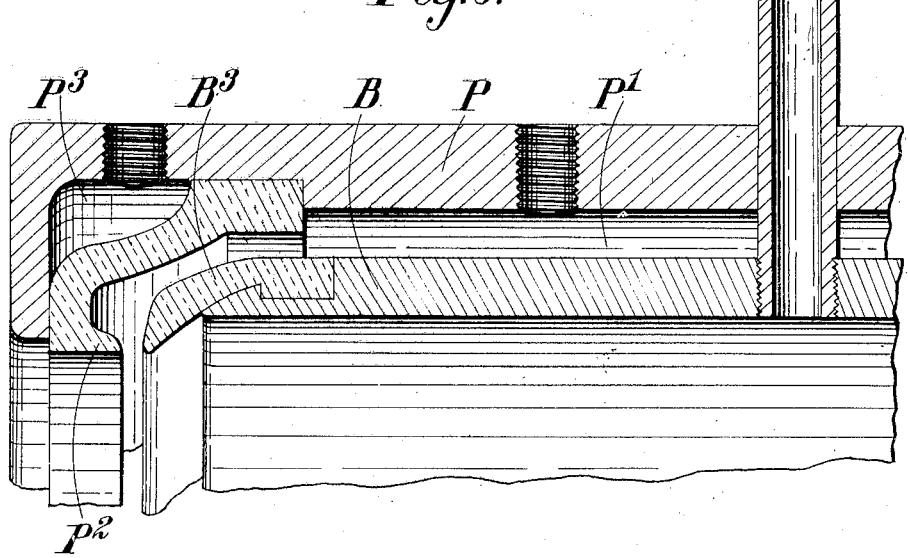
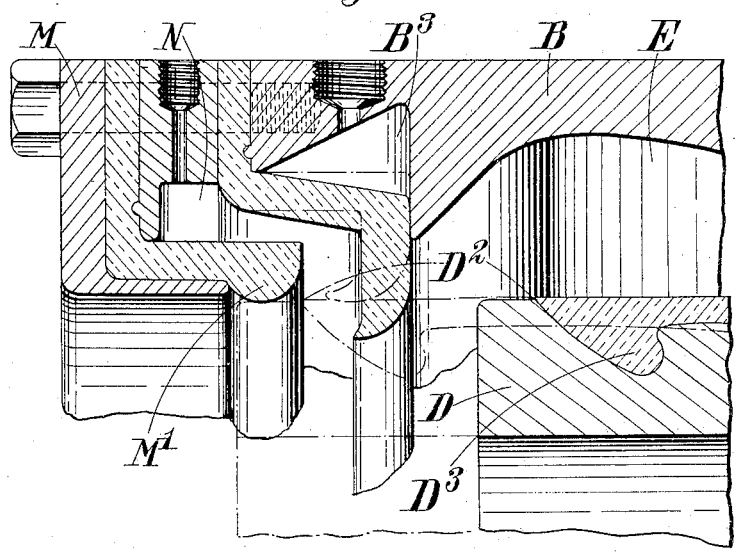

Patented Mar. 18, 1924.

1,487,036

UNITED STATES PATENT OFFICE.

THOMAS SLOPER, OF DEVIZES, ENGLAND.

APPARATUS FOR USE IN THE MANUFACTURE OF RUBBER GOODS.

Application filed January 11, 1923. Serial No. 611,994.

*To all whom it may concern:*

Be it known that I, THOMAS SLOPER, a subject of the King of England, residing at Devizes, Wiltshire, England, have invented certain new and useful Improvements in Apparatus for Use in the Manufacture of Rubber Goods, of which the following is a specification.

This invention is for improvements in or relating to apparatus for use in the manufacture of rubber goods and processes of handling such goods during manufacture.

This invention has reference to the type of apparatus for removing a "flat" tyre-band or band-like article from its support or for transferring it from one support to another, and comprises a cylindrical cavity-member or co-operating member arranged to receive within it or be itself introduced within the tyre-band or other article, the latter being in position upon its support, and provided on that face which is directed towards the tyre-band with circumferentially extending lips which bear with sealing contact upon the two edges of the tyre-band so that a circumferentially extending cavity, of which the said band constitutes a flexible wall, is provided, into which the band may be forced by fluid-pressure produced exterior to the cavity. The cavity may in some instances have that face which is directed towards the tyre-band plain and the side walls of the cavity will then be constituted solely by the lips.

In the apparatus above referred to, the pressure on the tyre-band was due to exhaustion of the air from the aforesaid cavity.

The present invention has for its object to provide certain improvements in such apparatus which will render it more efficient when used for tyre-bands of the larger sizes.

According to the present invention, there is combined with the cavity member in apparatus of the type described a compression chamber or chambers so disposed relatively to the tyre-band and its support that the joints along the two edges of the band between the band and the support are exposed to the interior of the chamber or chambers, and means for raising the pressure within the said chamber or chambers above atmospheric pressure so as to force the tyre-band away from its support into the aforesaid cavity.

Means may be provided whereby the cavity may be placed into communication with exhausting means for the purpose of increasing the relative pressure on the tyre-band or for retaining the band in the cavity after the super-atmospheric pressure has been released.

Preferably, the apparatus is provided with means whereby the cavity may be placed at will either into communication with the atmosphere or with exhausting means.

A process according to this invention for the removal of a tyre-band or other expansible article of band-like formation from a cylindrical or annular support consists in introducing the tyre-band when on its support around or within a cylindrical member forming with the tyre-band a circumferentially extending cavity, exposing that surface of the tyre-band which is exterior to the said cavity to a fluid-pressure greater than atmospheric-pressure so as to force the band away from its support into the aforesaid cavity, removing the support from the tyre-band whilst the latter is held away from it and releasing the super-atmospheric pressure from the tyre-band so that the latter may relax and move out of the cavity.

Alternatively, in the carrying out of the process just described, the air may be exhausted from the circumferentially extending cavity so that the super-atmospheric pressure can be released from the tyre-band prior to the removal of the support from the band.

Again, the exhaustion of the air from the aforesaid cavity may be utilized in addition to the super-atmospheric pressure so as to increase the relative pressure on the tyre.

In the accompanying drawings which illustrate the invention—

Figure 2 is a longitudinal section on a larger scale than that of Figure 1 through part of the apparatus illustrating an alternative construction, and Figure 3 is a section similar to Figure 2 through part of the apparatus illustrating another alternative construction.

Figure 1:
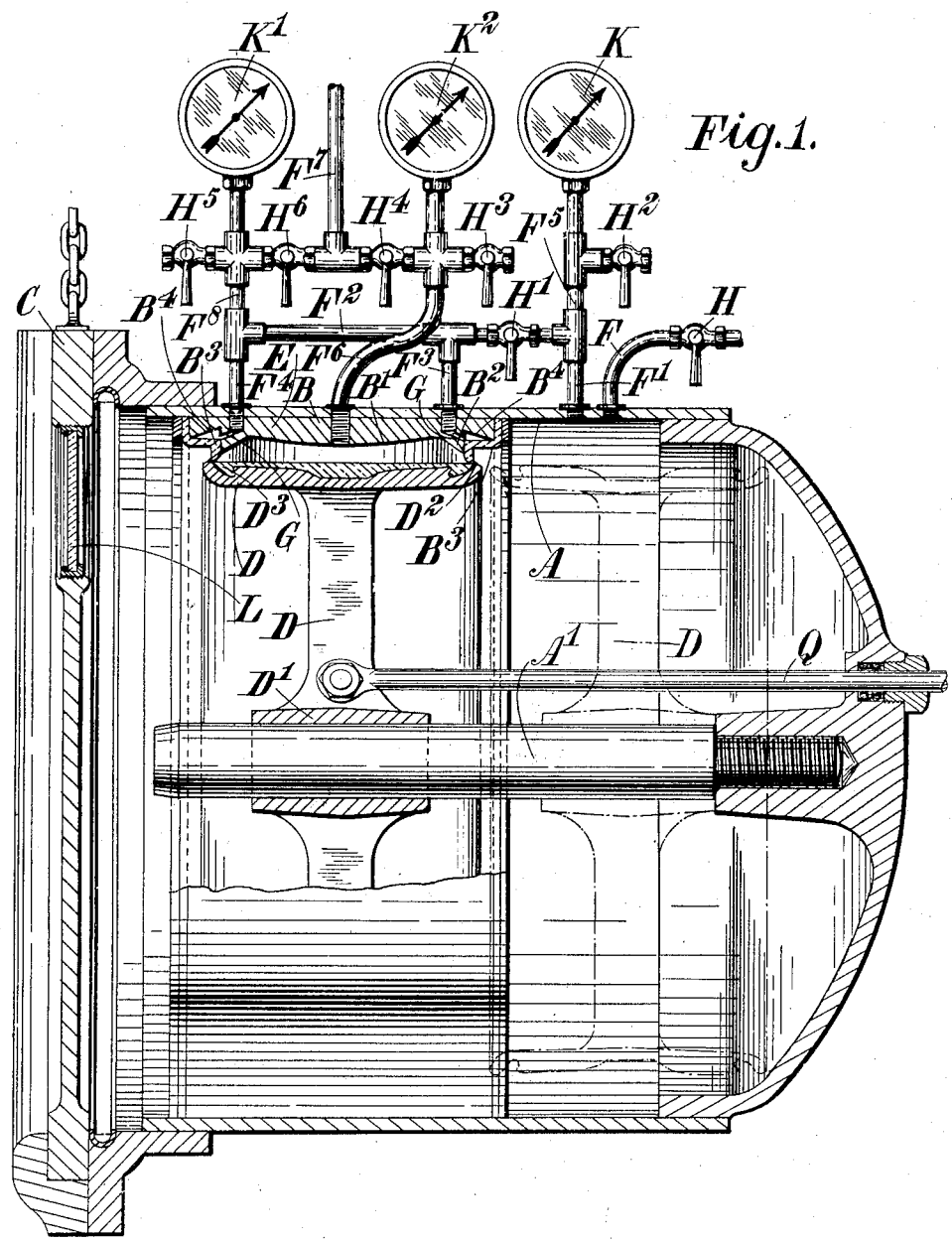
Figure 1 is a vertical longitudinal section through the apparatus constructed acording to one method of carrying out the invention.

The apparatus comprises a cylindrical drum A closed at one end and having a central arm $A^1$ concentric with the drum and extending through it from the closed to the open end. Within the drum and situated near the open end thereof is an annular cavity-member B. This cavity-member is secured to the drum A and is formed on its cylindrical inner face with a circumferentially extending recess $B^1$. The drum A has a gas-tight closure member C which may conveniently be of the vertically sliding and counterbalanced type.

A cylindrical tyre-band support D is provided with a central boss $D^1$ and is supported on the arm $A^1$ so as to be capable of sliding along it to occupy the position at the closed end of the drum as shown in chain-line in Figure 1, the drum itself having sufficient length to permit of the two positions for the tyre-band support. The tyre-band support may take any form, for instance it may constitute either a "former" or a mould upon which the tyre-band has been vulcanized. The recess $B^1$ in the cavity-member B is of such breadth that its sides $B^2$ register with the tyre-band $D^3$ slightly within the extreme edges thereof. Adjacent the sides $B^2$ of the recess $B^1$ and exterior to the recess are two circumferentially extending and flexible sealing lips $B^3$ which bear, when the tyre-band is in position within the cavity-member, with sealing contact upon the tyre-band just within the edges thereof so that the joint $D^2$ between the tyre-band and its support is exposed to the interior of the drum. As will be readily understood a circumferentially extending cavity E is thus formed around the tyre-band with the latter as a flexible wall.

The sealing-lips $B^3$ being flexible are capable of moving radially and to receive them the cavity-member B is formed with two circumferentially extending recesses $B^4$.

The drum is connected by a pipe F to a compressed air-supply the control being effected by a valve H. The drum is also put into communication with the recesses $B^4$ by means of the pipes $F^1$, $F^2$, $F^3$ and $F^4$ and conduits G so that the pressures within the drum and behind the lips may be equalized for the purpose of preventing the lips from moving on the admission of compressed-air into the drum. The communication between the drum and the recesses for the lips is controlled by a valve $H^1$ and the drum is placed into communication with the atmosphere by way of the pipe $F^5$ and valve $H^2$. The annular cavity E may be placed at will either into communication with the atmosphere or with exhausting means conveniently by means of the pipe $F^6$, valves $H^3$ and $H^4$ and pipe $F^7$, the valve $H^3$ opening into the atmosphere and the valve $H^4$ controlling the exhaust suction. The recesses $B^4$ behind the sealing-lips are arranged to communicate with the atmosphere by means of the pipe $F^8$ and valve $H^5$. They are also arranged to communicate with exhausting means by a connection from the aforesaid exhaust suction-pipe, the control being effected by the valve $H^6$. Pressure gauges K, $K^1$ and $K^2$ are conveniently provided for indicating the pressures within the drum, behind the sealing-lips, and within the annular cavity respectively.

The operation of the apparatus is as follows:—

Assuming all the valves are closed the closure member C is raised and the exhaust valve $H^6$ is opened. This causes the sealing-lips $B^3$ to be sucked into their recesses. The support with the tyre-band in position thereon is then introduced on to the arm $A^1$ and pushed into the drum until it occupies the position shown in full lines in Figure 1. The valve $H^6$ is then closed and either the valve $H^5$ or the valve $H^1$ is opened; this permits air to enter the recesses behind the sealing-lips so that the lips return on to the edges of the tyre-band. The closure member C is then dropped home so as to close the drum. The valve $H^3$ is then opened so as to place the cavity into communication with the atmosphere. The valve $H^5$ is again closed if it has been previously opened and the valve $H^1$ is opened to allow the recesses behind the sealing-lips to be placed into communication with the interior of the drum. Then the valve H is opened to admit compressed air into the drum and recesses $B^4$. The joints $D^2$ between the tyre-band and its support being exposed to the interior of the drum are also exposed to the pressure therein and in consequence the compressed-air gets in between the band and its support and forces the tyre-band away from the support into the cavity E surrounding it. When the band is quite clear of its support the latter is moved along the arm to the position shown in dotted lines by means exterior to the drum and operable without releasing the pressure in the drum. The valve $H^2$ is then opened so as to place the interior of the drum into communication with the atmosphere and allow the tyre-band to relax from out of the cavity.

Any convenient means may be employed for moving the support along the arm $A^1$, for example a rod Q may extend through a stuffing-box in the back of the drum A and be attached to the support D.

When it is desired to employ a vacuum as well as compressed air in order to increase the effective pressure on the tyre-band, valve $H^4$ is opened instead of valve $H^3$ and is closed again and valve $H^3$ opened after the support has been removed from the cavity-member.

Again a vacuum in the cavity may be employed to retain the band clear of the support while the latter is removed, instead of maintaining super-atmospheric pressure in the chamber during this operation. In this case after valve H⁴ has been opened the super-atmospheric pressure is released and the closure member C raised. The tyre-band support is then removed or pushed into the position shown in dotted lines. If it is desired to place the tyre-band on another support as for instance, when transferring it from a "former" to a mould, the new support may be placed in position within the expanded band after which valve H⁴ is closed and valve H³ opened allowing atmospheric pressure to return to the cavity and the tyre-band to relax on to its new support.

An observation window L may be provided, for example in the closure C so as to permit of the operation being viewed from the outside for the purpose of ascertaining whether it has been properly carried out before releasing the pressure in the drum.

In the alternative construction illustrated by Figure 2 the aforesaid cavity-member B has two annular members M secured one at either end and provided with flexible sealing-lips M¹. These members and their lips are so formed as to provide circumferentially extending compression chambers N to the interior of which the joints D² between the tyre-band and its support are exposed. The flexible lips B³ of the cavity-member B bear on the tyre-band as before just within its edges while those M¹ of the annular members M bear on the tyre-band support just clear of the edges of the tyre-band. These compression chambers take the place of the drum in the other construction described above with reference to Figure 1 and are arranged to communicate with the atmosphere and with a compressed-air supply in the same manner as in that other construction.

The chain lines on Figure 2 show the position of the tyre-band and its support and the sealing-lips when the former are in correct operative position within the cavity-member.

In the second alternative construction illustrated by Figure 3 the cavity-member B is surrounded by a cylindrical shell P which provides the equivalent of the two annular members M of Figure 2, and the space P¹ between the cavity-member and the shell constitutes a pressure-chamber. The cavity-member B and the cylindrical shell P have sealing-lips B³ and P² respectively as shown. As in the first alternative construction these lips bear upon the tyre-band and upon its support in close proximity to the joint between the two. In order to allow of the insertion of the tyre-band and its support into position within the cavity-member B and also to provide means for pressing the sealing-lips P² against the edges of the support a space P³ is provided as before behind each sealing-lip of the cylindrical shell P, these spaces being arranged to communicate at will either with exhausting means, a compressed-air supply or with the atmosphere.

The operation of these two alternative constructions shown in Figures 2 and 3 will be similar to that described in relation to the first construction when a vacuum is used for holding the band away from the support while the latter is being removed.

Various modifications in the construction may be made, for instance in the construction first described the drum A may be long enough to allow say a "former" with the tyre-band in position thereon to be introduced into operative position within the cavity-member B, and say a mould to be supported by the arm A¹ between the cavity-member and the closure C, in addition to providing a space towards the closed end of the drum for receiving the "former" after the tyre-band has been expanded into the cavity. With this arrangement, as will be readily understood, the operation of transferring the tyre-band from the "former" to the mould may be carried out without employing exhausting means for retaining the tyre-band within the cavity, the mould and the "former" being moved by external means without releasing the pressure in the drum.

When it is required to remove a tyre-band or other article from the inner periphery of an annular support, the cavity may be provided on the cylindrical face of an interior member positioned inside the annular support, the whole being contained by a drum as in the first construction.

Alternatively, the modified constructions described in Figures 2 and 3 may be adapted for application to supports with the tyre-band on the inner face. In any case, the connections between the cavity, the compression chamber or chambers exterior to the cavity and the atmosphere and exhausting means may be all as in the constructions previously described.

It will be understood that whilst compressed-air is specified any fluid may be employed that is found most convenient for providing the super-atmospheric pressure.

I claim—

1. In apparatus for manipulating expansible "flat" endless bands, the combination of a support having an annular face for carrying a band, a co-operating member having an annular face arranged to receive the band from said support, two annular sealing lips carried on said member, one at each edge thereof, and arranged to make sealing contact with the edge portions of the band on the said support and thereby form a cavity whereof the said band constitutes a flexible wall, a chamber so disposed in relation to said member, said support and the band on the latter that the annular joint along an edge of the band between the band and its support is exposed to the interior of the chamber, and means for raising the pressure within said chamber above atmospheric pressure so as to force the band away from said support into said cavity, substantially as set forth.

2. In apparatus for manipulating expansible "flat" endless bands, the combination of a support having an annular face for carrying a band, a co-operating member having an annular face arranged to receive the band from said support, two annular sealing lips carried on said member, one at each edge thereof, and arranged to make sealing contact with the edge portions of the band on the said support and thereby form a cavity whereof the said band constitutes a flexible wall, a chamber so disposed in relation to said member, said support and the band on the latter that the annular joints along the edges of the band between the band and its support are exposed to the interior of the chamber, and means for raising the pressure within said chamber above atmospheric pressure so as to force the band away from said support into the said cavity, substantially as set forth.

3. In apparatus for manipulating expansible "flat" endless bands, the combination of a support having an annular face for carrying a band, a co-operating member having an annular face arranged to receive the band from said support, two annular sealing lips carried on said member, one at each edge thereof and arranged to make sealing contact with the edge portions of the band on the said support and thereby form a cavity whereof the said band constitutes a flexible wall, a chamber so disposed in relation to said member, said support and the band on the latter that the annular joint along an edge of the band between the band and its support is exposed to the interior of the chamber, means for raising the pressure within said chamber above atmospheric pressure so as to force the band away from said support into said cavity, and means for placing said cavity into communication with exhausting means, substantially as set forth.

4. In apparatus for manipulating expansible "flat" endless bands, the combination of a support having an annular face for carrying a band, a co-operating member having an annular face arranged to receive the band from said support, two annular sealing lips carried on said member, one at each edge thereof, and arranged to make sealing contact with the edge portions of the band on the said support and thereby form a cavity whereof the said band constitutes a flexible wall, a chamber so disposed in relation to said member, said support and the band on the latter that the annular joint along an edge of the band between the band and its support is exposed to the interior of the chamber, means for raising the pressure within said chamber above atmospheric pressure so as to force the band away from said support into said cavity, and means for placing the said cavity at will either into communication with the atmosphere or with exhausting means, substantially as set forth.

5. In apparatus for manipulating expansible "flat" endless bands, the combination of a support having an annular face for carrying a band, a co-operating member having an annular face arranged to receive the band from said support and having two annular grooves, one at each edge, two annular sealing lips carried on said member, one at each edge thereof and arranged to enter radially into said grooves, and also to make sealing contact with the edge portions of the band on the said support and thereby form a cavity whereof said band constitutes a flexible wall, a chamber so disposed in relation to said member, said support and the band on the latter that the annular joints along the edges of the band between the band and its support are exposed to the interior of the chamber, means for raising the pressure within said chamber above atmospheric pressure so as to force the band away from said support into the said cavity, and means for placing said grooves at will either into communication with the atmosphere or under a fluid pressure substantially equal to that obtaining within said chamber, substantially as set forth.

6. In apparatus for manipulating expansible "flat" endless bands, the combination of a support having an annular face for carrying a band, a co-operating member having an annular face arranged to receive the band from said support and having two annular grooves, one at each edge, two annular sealing lips carried on said member, one at each edge thereof, and arranged to enter radially into said grooves, and also to make sealing contact with the edge portions of the band on the said support and thereby form a cavity whereof said band constitutes a flexible wall, a chamber so disposed in relation to said member, said support and the band on the latter that the annular joints along the edges of the band between the band and its support are exposed to the interior of the chamber, means for raising the pressure within said chamber above atmospheric pressure so as to force the band away from said support into the said cavity, means for placing said grooves at will either into communication with the atmosphere or under a fluid pressure substantially equal to that obtaining within said chamber, or into communication with exhausting means, substantially as set forth.

7. In apparatus for manipulating expansible "flat" endless bands, the combination of a drum closed at one end, a support having an annular periphery for carrying a band in said drum, which drum has an annular inner face arranged to receive the band from said support, two annular sealing lips carried on said drum, one at each side of said face, and arranged to make sealing contact with the edge portions of the band on its support and thereby form a cavity whereof the said band constitutes a flexible wall, the joints along the edges of the band between the band and its support being exposed to the interior of the drum, a closure member arranged to close the other end of said drum fluid-tight, and means for raising the pressure within said drum above atmospheric pressure, substantially as set forth.

8. In apparatus for manipulating expansible "flat" endless bands, the combination of a drum closed at one end, a support having an annular periphery for carrying a band in said drum, which drum has an annular inner face arranged to receive the band from said support, two annular sealing lips carried on said drum, one at each side of said face, and arranged to make sealing contact with the edge portions of the band on its support and thereby form a cavity whereof the said band constitutes a flexible wall, the joints along the edges of the band between the band and its support being exposed to the interior of the drum, a closure member arranged to close the other end of said drum fluid-tight, means for raising the pressure within said drum above atmospheric pressure for forcing the band away from said support into the said cavity, and means for moving the support in the drum axially away from the band without releasing the super-atmospheric pressure within the drum, substantially as set forth.

9. In apparatus for manipulating expansible "flat" endless bands, the combination of a drum closed at one end and having a cylindrical internal periphery, a supporting arm mounted coaxially within the drum, a support that is slidable along said arm into two positions clear of one another in the drum, and has an annular periphery for carrying a band, which drum has an annular inner face disposed concentrically with the periphery of said support and arranged to receive the band from the latter, two annular sealing lips carried on said drum one at each side of its annular inner face and arranged to make sealing contact with the edge portions of the band on its support and thereby form a cavity whereof the said band constitutes a flexible wall, the joints along the edges of the band between the band and its support being exposed to the interior of the drum, a closure member arranged to close the other end of said drum fluid-tight, and means for raising the pressure within said drum above atmospheric pressure, substantially as set forth.

10. In apparatus for manipulating expansible "flat" endless bands, the combination of a drum closed at one end and having a cylindrical internal periphery, a supporting arm mounted coaxially within the drum, a support that is slidable along said arm into two positions clear of one another in the drum, and has an annular periphery for carrying a band, which drum has an annular inner face disposed concentrically with the periphery of said support and arranged to receive the band from the latter, two annular sealing lips carried on said drum one at each side of its cylindrical inner face and arranged to make sealing contact with the edge portions of the band on its support and thereby form a cavity whereof the said band constitutes a flexible wall, the joints along the edges of the band between the band and its support being exposed to the interior of the drum, a closure member arranged to close the other end of said drum fluid-tight, means for raising the pressure within said drum above atmospheric pressure for forcing the band away from said support into the said cavity, and means for moving the support in the drum axially away from the band without releasing the super - atmospheric pressure within the drum, substantially as set forth.

In testimony whereof I affix my signature.

THOMAS SLOPER.